UNITED STATES PATENT OFFICE.

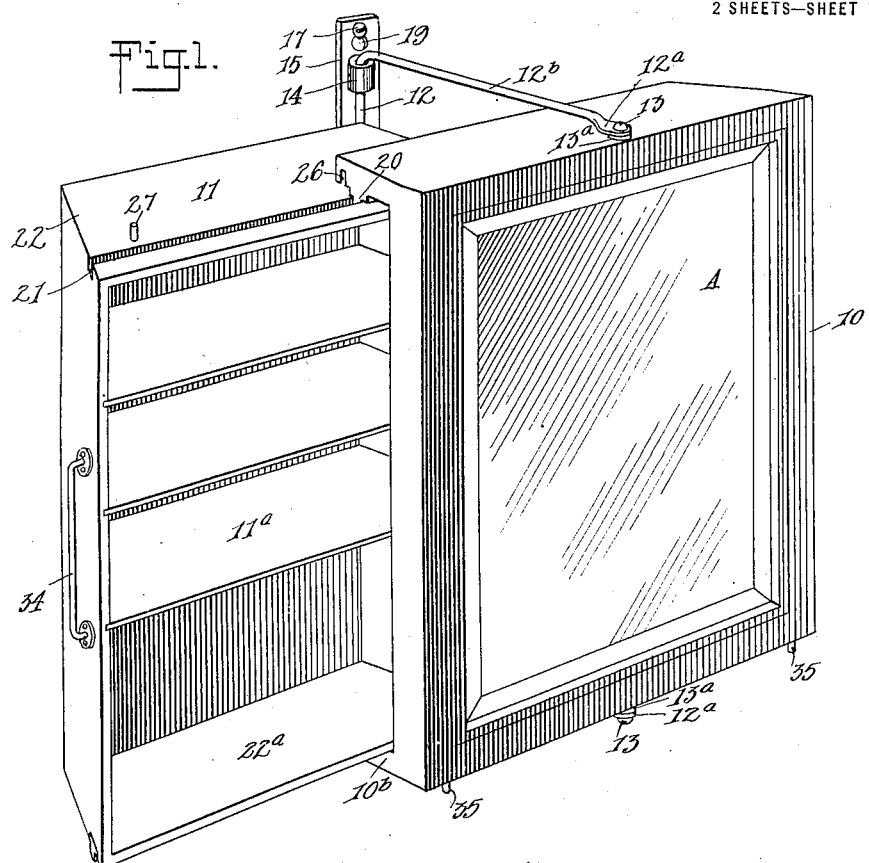
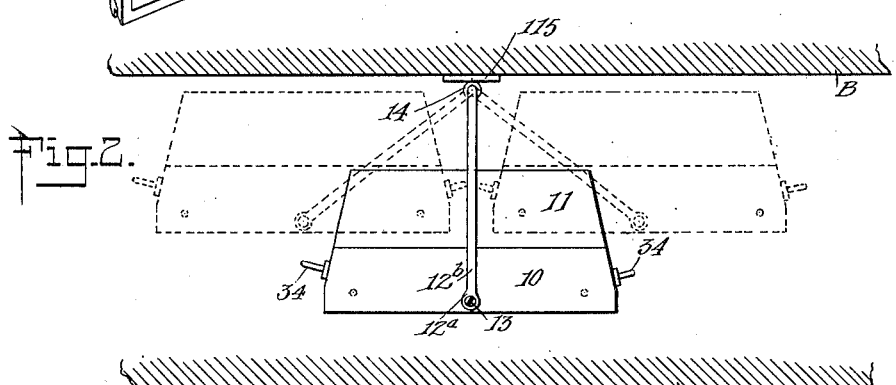
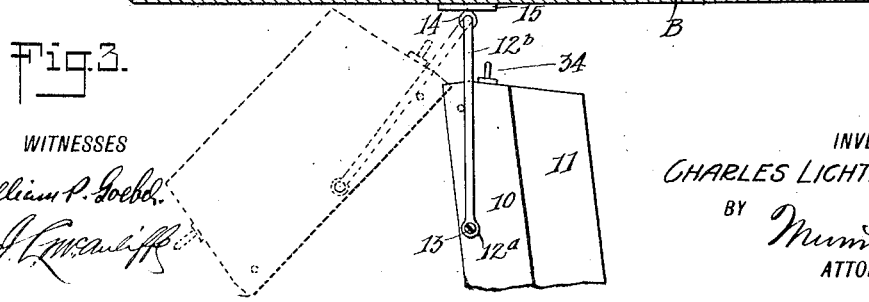

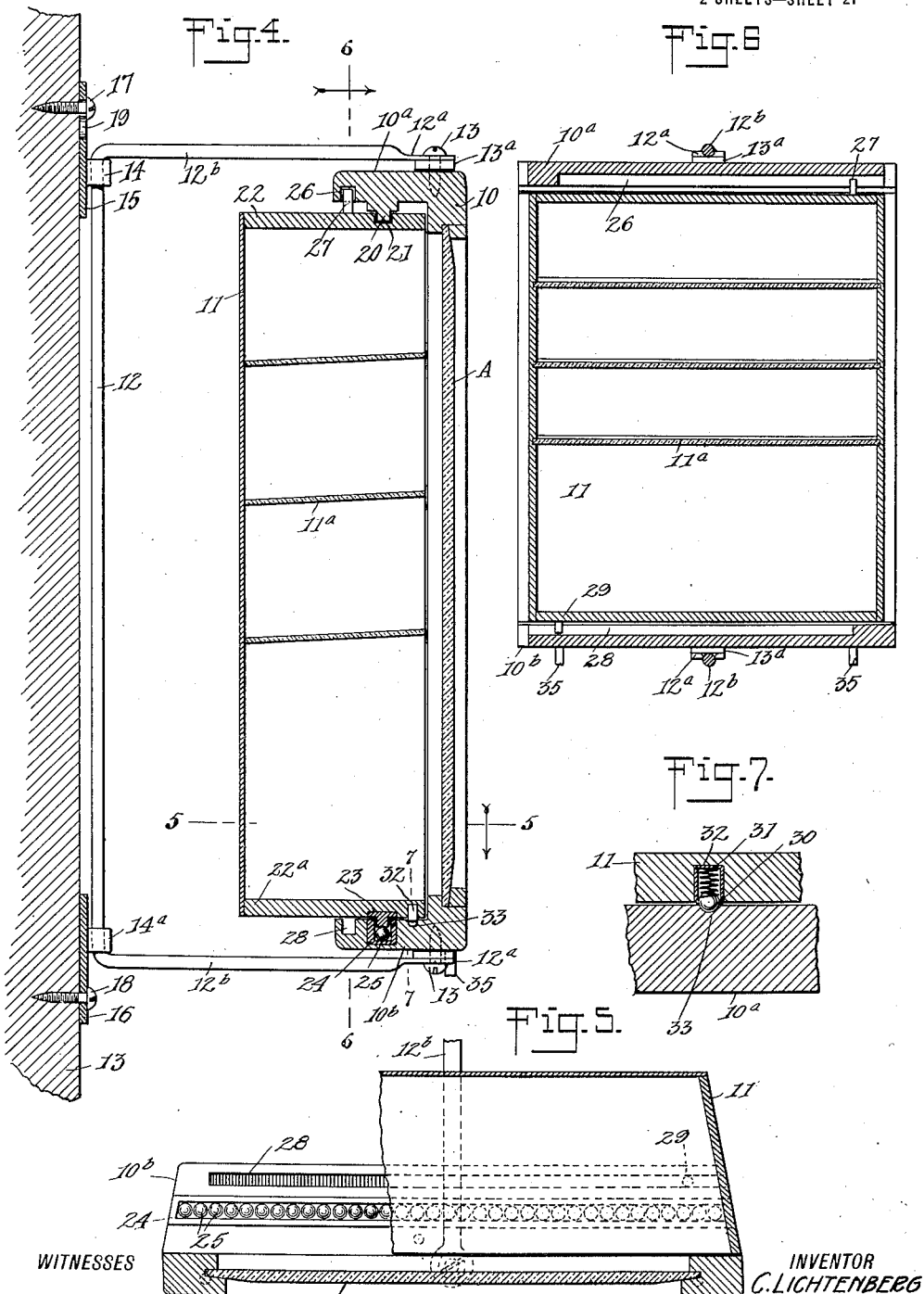

CHARLES LICHTENBERG, OF BROOKLYN, NEW YORK.

COMBINED SHAVING MIRROR AND CABINET.

1,380,222.     Specification of Letters Patent.     Patented May 31, 1921.

Application filed May 3, 1920. Serial No. 378,579.

*To all whom it may concern:*

Be it known that I, CHARLES LICHTENBERG, a citizen of the United States, and a resident of the city of New York, borough of Brooklyn, in the county of Kings and State of New York, have invented a new and Improved Combined Shaving Mirror and Cabinet, of which the following is a description.

The general object of my invention is to provide a combined mirror and cabinet with supporting means therefor and so arranged that the mirror with the cabinet thereon may be variously adjusted to suit light conditions so that in shaving, adjusting the hair, and the like, a perfect image may be reflected by the mirror unaffected by shadows or defective illumination and regardless of the direction of the light. At the same time the arrangement of the cabinet is characterized by perfect sanitary conditions and maximum accessibility by reason of being movable to the right or left of the mirror frame to extend beyond either vertical side edge of said frame, the cabinet being thus readily available as a receptacle for shaving appurtenances, medicines, and the like.

The above and other objects are attained by the novel construction and arrangement of parts as explained in the specific description hereinafter given and from which the distinguishing features of the invention as well as its advantages will more clearly appear.

Reference is to be had to the accompanying drawings forming a part of this specification, it being understood that the drawings are merely illustrative of one example of the invention.

Figure 1 is a perspective view of a combined mirror and cabinet and the supporting means therefor, showing the cabinet slid to a position projecting beyond one side edge of the mirror for affording access to the interior of the cabinet;

Fig. 2 is a plan view of the combined mirror and cabinet and the supporting means, the full lines showing the parts in one position and the dotted lines indicating two other positions;

Fig. 3 is a fragmentary plan view given to show adjustments of the combined mirror and cabinet, additional to those indicated in Fig. 2;

Fig. 4 is an enlarged transverse vertical section, the supporting element being in side elevation;

Fig. 5 is a fragmentary sectional plan view, the section being taken on the line 5—5, Fig. 5;

Fig. 6 is a longitudinal sectional elevation on the line 6—6, Fig. 4 but on a scale considerably reduced;

Fig. 7 is a detail in vertical section on the line 7—7, Fig. 4.

In carrying out my invention in accordance with the illustrated example, a mirror frame 10 is provided, adapted to receive a mirror A in any suitable manner and supported on said frame at the back is a cabinet 11, the front of which is open, the frame 10 and the mirror forming a closure for said cabinet. A supporting element 12, here shown as of U-shape and including a vertical spindle and upper and lower forwardly extending arms thereon, the front ends of which arms are pivotally secured as by screws 13 to the frame 10 at the top and bottom at the approximate center, washers 13$^a$ being employed in practice beneath the arms and the fasteners 13 passing through the flattened and broadened ends 12$^a$ thereof. The supporting element 12 turns in upper and lower bearings 14, 14$^a$ on brackets 15, 16 adapted to be secured to a wall B or the like as by screws 17, 18. The upper bracket 15 has a keyhole slot 19 so that said bracket may be passed onto the screw 17 and then dropped so that the screw engages in the narrow portion of the slot 19 after which the lower bracket 16 is secured by its screw 18. The arrangement permits the element 12 to swing laterally in the bearings 14, 14$^a$ and with it the frame 10 and cabinet 11 through an arc of approximately 120°.

The frame 10 is formed with a rearwardly extending top flange 10$^a$ and a rearwardly extending bottom flange 10$^b$, between which the cabinet 11 is sustained to have movement relatively to the frame to either side. In the present example a track 20 is formed upon or secured to the flange 10$^a$ at the under side and its running edge is accommodated in the guide groove 21 in the top 22 of the cabinet. Similarly, the under side of the bottom 22$^a$ of the cabinet has formed upon or secured thereto a track 23 receivable in the grooved upper surface of the flange 10$^b$, the groove being presented in the illustrated form by a channel bar 24 containing ball bearings 25.

In the under side of the upper flange 10$^a$ there is produced parallel with the track groove 21 a blind slot 26 and an upstanding stop pin 27 on the top 22 of the cabinet may have movement in said slot. A reversely disposed blind slot 28 is provided in the upper face of the lower flange 10$^b$ and accommodates a depending stop pin 29 on the bottom 22$^a$ of the cabinet.

The supporting element 12 may swing about its vertical axis in the bearings 14, 14$^a$ to the right or left of the central position and the frame 10 with the cabinet thereon may turn in said supporting element with the fasteners 13 as an axis. Thus, the frame 10 and cabinet 11 may be swung to the right or left with a parallel movement from the full-line central position of Fig. 2 to either of the dotted line positions to the right or left thereof to dispose the frame and cabinet parallel with the wall B and close thereto. Or, in any angular position of the supporting element 12, the frame and cabinet may be turned about the axis represented by the fasteners 13 to face the mirror to the right or left or in any intermediate angular position. Also, it will be clear that irrespective of the position of the supporting element 12 and frame 10 and therefore in any angular position of the cabinet 11, the latter can be slid on the frame 10 to the right or left to lie for its major portion beyond either vertical side edge of the frame, thereby affording access to the cabinet which may be provided with any suitable system of shelves 11$^a$. The result is that the mirror A may be positioned to reflect a perfect image and the light availed of to the maximum extent regardless of the direction of the light relatively to the attaching brackets 15, 16. Also, any available light can be utilized for lighting up the cabinet since the latter can be presented in open form and in a position for the light to be availed of to the best advantage. In the movement of the cabinet on the frame 10, in one direction, the stop pin 27 will limit the movement while the movement in the opposite direction will be limited by the stop 29, the stops being arrested by the blind ends of the reversely disposed slots, 26, 28. The turning of the frame 10 in the supporting element 12 on the vertical axis represented by the fasteners 13, is desirably limited in order that the mirror may be steadied in a given position and I provide for the purpose in the illustrated form of my invention, stop pins 35 depending at the under side of frame 10 and adapted by engagement with the lower arm 12$^b$ of the supporting element 12 to limit the turning movement of the frame 10 of the supporting element in either direction. With one of the stop pins 35 lying against the lower arm 12$^b$ the mirror and cabinet will have less tendency to accidental displacement. The dimensions of the frame 10 and cabinet 11 relatively to the length of the arms 12$^b$ of the supporting element are such that the frame and cabinet may turn about the axis represented by the fasteners 13 through an arc of about 180° from a position with one stop 35 contacting with the lower arm B of the supporting element to a position with the other stop 35 engaging said arm.

Means may be provided to retain the cabinet against accidental movement on the frame 10, as for example, a spring-pressed holding member either on the cabinet and adapted to engage the frame or vice versa, in the closed position of the cabinet. In the illustrated form as best seen in Fig. 7, a ball 30 is under the pressure of a spring 31 disposed in a housing 32 let into the bottom 22$^a$ of the cabinet 11, said ball being adapted to be sprung into the depression 33 in the upper face of the flange 10$^b$ of the mirror frame 10 when the cabinet is in a position closed by said frame and the mirror A. Suitable handles 34 may be provided on the cabinet at the sides for sliding the cabinet on the frame.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. An article of the class described including a supporting element, a structure mounted in said supporting element to turn therein about a vertical axis, said structure presenting rearwardly extending top and bottom flanges, a cabinet on said structure at the back between said flanges, means for slidably engaging the cabinet with said flanges for projecting the cabinet beyond either side of said structure, said flanges and said cabinet presenting respectively blind guide grooves, and stop pins movable in said grooves to limit the movement of the cabinet in either direction.

2. An article of the class described including a supporting element presenting forwardly extending top and bottom arms mounted to swing about a vertical axis, a structure mounted between said arms to turn about a vertical axis independently of the axis of said element, and stops on said structure adapted to engage an arm of said element for limiting the turning movement of said structure in either direction.

CHARLES LICHTENBERG.